(12) United States Patent
Goloubew et al.

(10) Patent No.: US 11,537,877 B2
(45) Date of Patent: Dec. 27, 2022

(54) DEEP LEARNING SYSTEM FOR ACCELERATED DIAGNOSTICS ON UNSTRUCTURED TEXT DATA

(71) Applicant: Cisco Technology, Inc., San Jose, CA (US)

(72) Inventors: Dmitry Goloubew, Waterloo (BE); Nassim Benoussaid, Louvain-la-Neuve (BE); Volodymyr Iashyn, Brussels (BE); Borys Viacheslavovych Berlog, Brussels (BE); Carlos M. Pignataro, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 937 days.

(21) Appl. No.: 16/374,911

(22) Filed: Apr. 4, 2019

(65) Prior Publication Data
US 2020/0257969 A1 Aug. 13, 2020

Related U.S. Application Data

(60) Provisional application No. 62/804,348, filed on Feb. 12, 2019.

(51) Int. Cl.
G06N 3/08 (2006.01)
G06F 16/35 (2019.01)
G06N 3/04 (2006.01)

(52) U.S. Cl.
CPC ............ *G06N 3/08* (2013.01); *G06F 16/35* (2019.01); *G06N 3/04* (2013.01)

(58) Field of Classification Search
CPC ............ G06N 3/08; G06N 3/04; G06N 5/003; G06N 7/005; G06N 20/10; G06N 20/20; G06F 16/35; G06F 16/353; G06F 16/04842; H04L 41/16; H04L 41/145; H04L 41/142
See application file for complete search history.

(56) References Cited

U.S. PATENT DOCUMENTS

2016/0292592 A1\* 10/2016 Patthak .................. H04L 41/16
2018/0285397 A1\* 10/2018 Huang ................ G06F 16/2228

OTHER PUBLICATIONS

Mahapatra et al. "Contextual Anomaly Detection in Text Data", Oct. 19, 2012 https://www.mdpi.eom/1999-4893/5/4/469file:///C:/Users/ypatel2/Downloads/algorithms-05-00469.pdf (Year: 2012).\*
Mahapatra et al., "Contextal Anomaly Detection in Text Data", Algorithms 2012, Oct. 19, 2012, pp. 469-489.

(Continued)

*Primary Examiner* — Yogeshkumar Patel
(74) *Attorney, Agent, or Firm* — Behmke Innovation Group LLC; Kenneth J. Heywood; Jonathon P. Western (57) ABSTRACT

In one embodiment, an apparatus obtains unstructured text generated by a device regarding operation of the device. The apparatus identifies the unstructured text as associated with a particular command or process that generated the unstructured text. The apparatus classifies a portion of the unstructured text as anomalous by inputting the portion of the unstructured text to a machine learning-based model trained to predict text generated by the particular command or process. The apparatus provides provide the unstructured text for display that includes an indication that the portion of the unstructured text is anomalous.

20 Claims, 9 Drawing Sheets

(56) References Cited

OTHER PUBLICATIONS

Du et al., "DeepLog: Anomaly Detection and Diagnosis from System Logs through Deep Learning", Session F2 Insights from Log(in)s, AMC Conference on Computer and Communications Security, CCS'17, Oct. 30-Nov. 3, 2017, Dallas, TX, pp. 1285-1298.
Meng Weibin et al., Device-Agnostic Log Anomaly Classification with Partial Labels, 2018 IEEE/ACM 26th International Symposium, Jun. 4, 2018, pp. 1-23, XPO33509085.
Chang Liu, Data Analysis of Minimally-Structured Heterogeneous Long: An experimental study and anomaly detection based on Recurrent Neural Network and Naive Bayes, diva-portal.org, Jan. 1, 2016, pp. 1-23, XPO55687558.
International Search Report dated May 4, 2020 In connection with PCT Application No. PCT/US2020/016502.

\* cited by examiner

Errors
 MAC/IP length inconsistencies : 5348
 Short IP packets received      : 0
 IP header checksum errors      : 322150  ──402
 No-route packet drops          : 40753197
 TTL failures                   : 1574677557
 MTU failures                   : 0

```
                              Router,Switch
* 550  01-00-5E-90-10-00  dynamic  YES      0  Po1
* 550  01-00-5E-90-10-01  static   NO       -  <drop>  ──412
* 749  01-00-5E-90-10-02  dynamic  YES    205  Po1
* 749  01-00-5E-90-10-03  dynamic  YES    290  Po1
*   5  01-00-5E-90-10-04  dynamic  YES     20  Po1
*   1  01-00-5E-90-10-05  static   YES      -  Gi1/3, Gi1/4, Gi1/5, Gi1/6
```

Background Task Statistics:
   Consistency Check count:   00000000004329035
   Consistency Errors:        00000000000010013 — 422
   SSRAM Consistency Errors:  00000000000000000
   Sanity Check count:       00000000000449030

Ethernet3/3 is down (UDLD empty echo, port error)
admin state is up, Dedicated Interface
Hardware: 1000/10000 Ethernet, address: 0006.f649.48b2 (bla 0006.f649.48b2)

DEEP LEARNING SYSTEM FOR ACCELERATED DIAGNOSTICS ON UNSTRUCTURED TEXT DATA

RELATED APPLICATION

This application claims priority to U.S. Provisional Patent Application No. 62/804,348, filed on Feb. 12, 2019, entitled "DEEP LEARNING SYSTEM FOR ACCELERATED DIAGNOSTICS ON UNSTRUCTURED TEXT DATA" by Goloubew et al., the contents of which are incorporated by reference herein.

TECHNICAL FIELD

The present disclosure relates generally to computer networks, and, more particularly, to a deep learning system for accelerated diagnostics on unstructured text data.

BACKGROUND

As computer networks continue to increase in size, the volume of event logs generated by the networking devices in the network can be quite large. For example, current wireless controllers can scale to approximately 150,000 users. In another example, some broadband platforms now support up to 100,000 users. In such devices, information may be captured about the individual sessions. When a particular user session fails, isolating the tracelog information for the failed session from among the large volume of logs can become very cumbersome due to the number, size, and distribution of the logs. To complicate matters further, many logs today are unstructured, meaning that they do not follow a predefined data model, making searching much more challenging.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an apparatus obtains unstructured text generated by a device regarding operation of the device. The apparatus identifies the unstructured text as associated with a particular command or process that generated the unstructured text. The apparatus classifies a portion of the unstructured text as anomalous by inputting the portion of the unstructured text to a machine learning-based model trained to predict text generated by the particular command or process. The apparatus provides provide the unstructured text for display that includes an indication that the portion of the unstructured text is anomalous.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate is over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
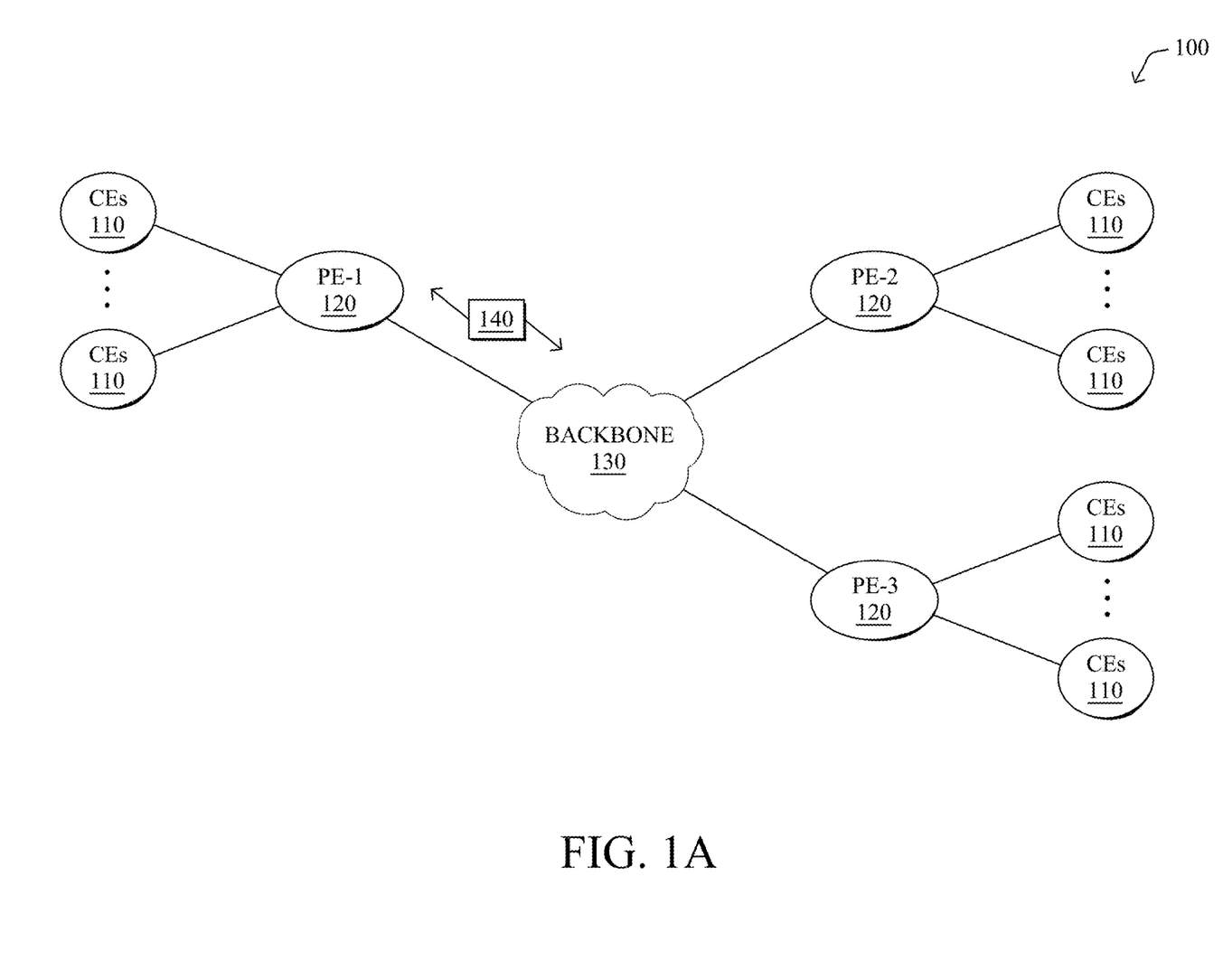
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
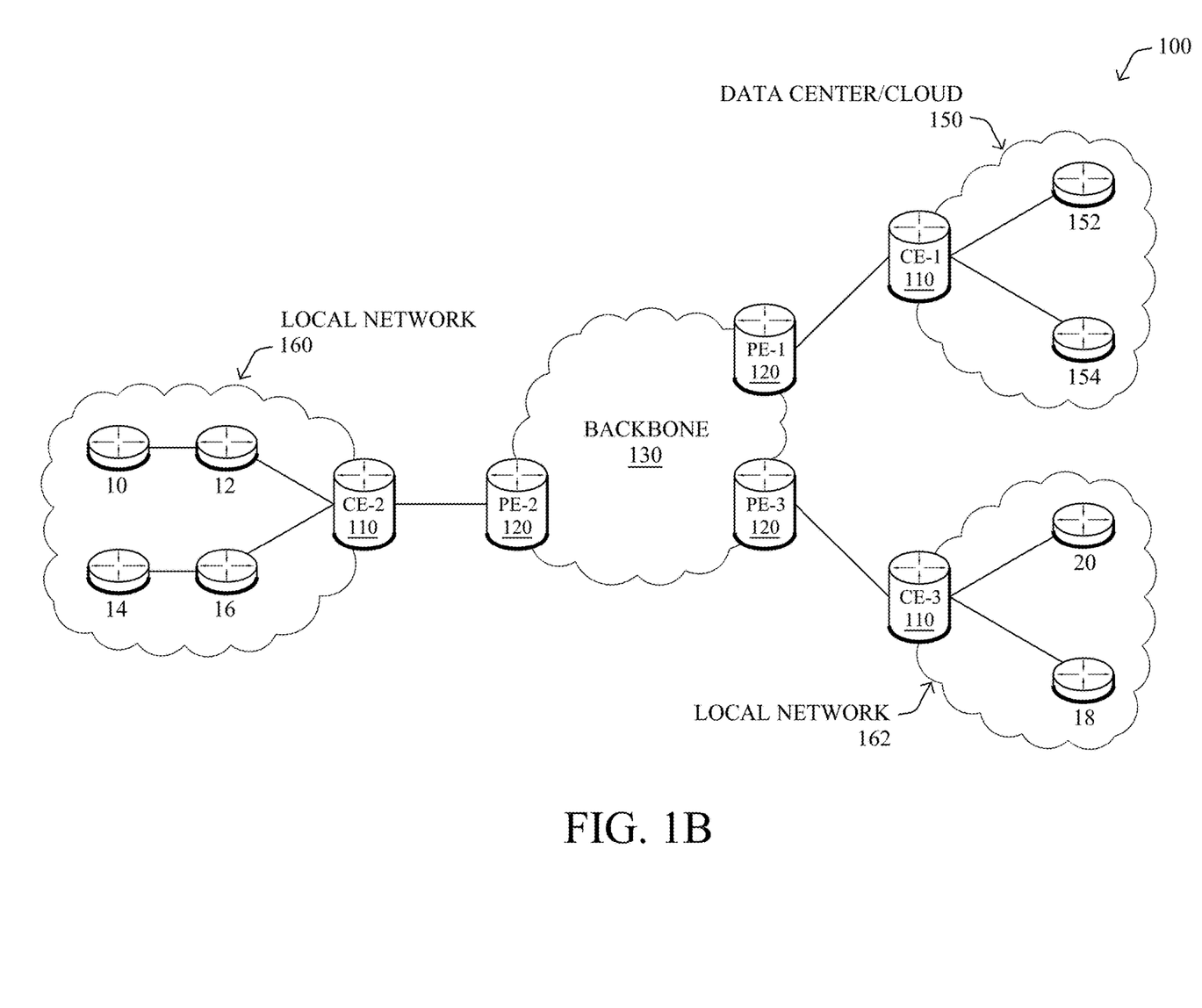

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such as the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
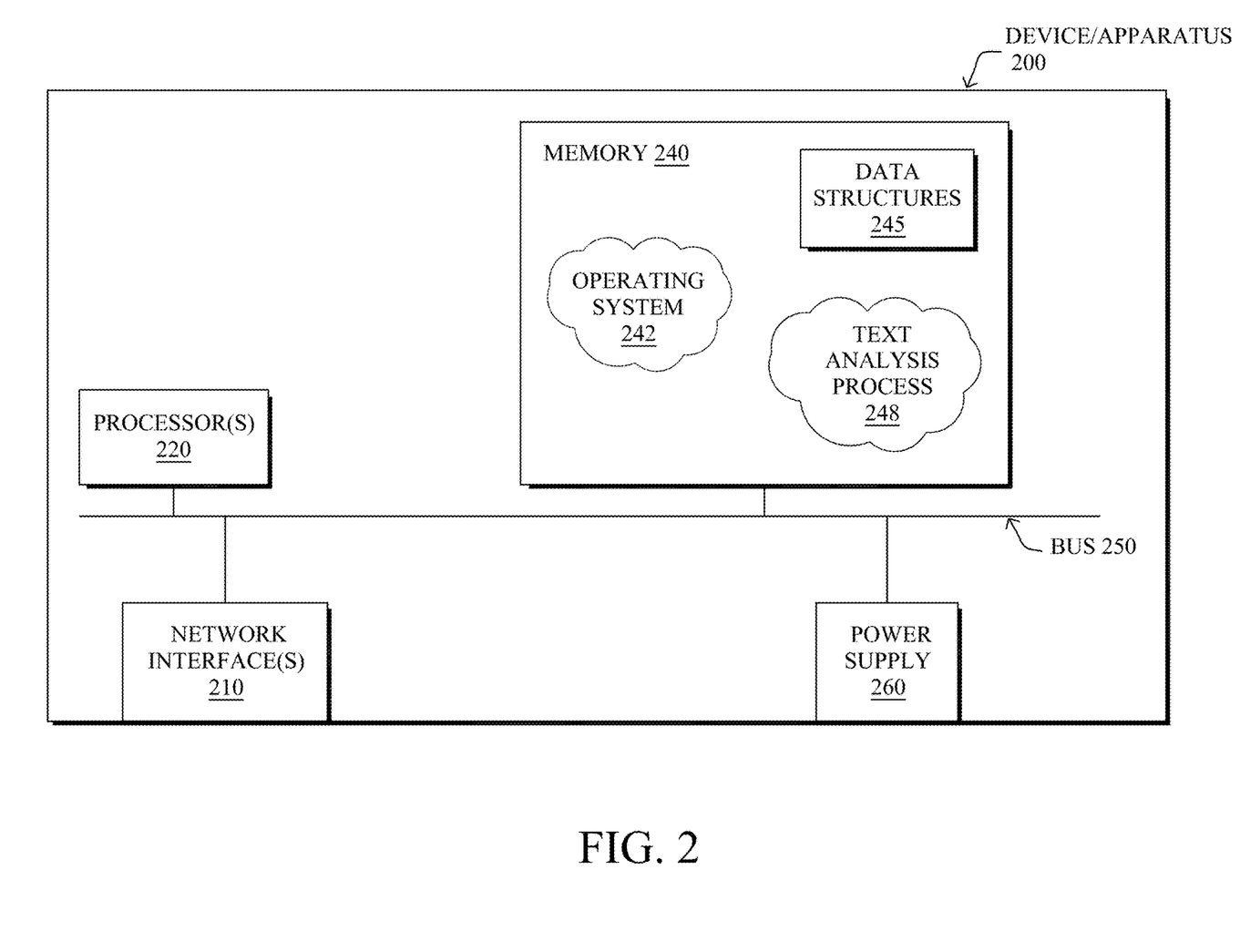
FIG. 2 illustrates an example network device/node.

FIG. 2 is a schematic block diagram of an example device/apparatus 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device/apparatus 200 may also be any other suitable type of device depending upon the type of network architecture in place, such as IoT nodes, etc. Device/apparatus 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a text analysis process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, text analysis process 248 may execute one or more machine learning-based classifiers to analyze log data and/or command line interface (CLI) output data from any number of networking devices. More specifically, text analysis process 248 may employ any number of machine learning techniques, to assess the gathered log and/or CLI data for purposes of highlighting important issues, automating configuration changes in the network, and the like. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, text analysis process 248 can use the model M to classify new data points, such as new log data obtained in the network. Often, M is a statistical model, and the cost function is inversely proportional to the likelihood of M, given the input data.

In various embodiments, text analysis process 248 may employ one or more supervised, unsupervised, or semi-supervised machine learning models. Generally, supervised learning entails the use of a training set of data, as noted above, that is used to train the model to apply labels to the input data. For example, the training data may include sample command line interface (CLI) output data and/or log data that has been labeled with a corresponding intent (e.g., what the data is trying to convey). On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that text analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

As noted above, the challenge with modern networking devices (e.g., routers, switches, wireless LAN controllers, etc.) that are capable of logging at a very high scale is that it can be difficult to isolate the failure logs or other text of interest, such as from the CLI of the device. Notably, modern wireless LAN controllers will soon support up to 150,000 users and broadband platforms will soon support up to 100,000 users. Such networking devices are capable of storing tens, or even hundreds, of gigabytes of logs, locally. This means that isolating log information for a particular failed session from among the large volume of logs can become quite challenging.

Deep Learning System for Accelerated Diagnostics on Unstructured Text Data

The techniques herein use machine learning and statistical analysis to identify patterns and deviations in large set of unstructured textual data, output from devices and software in network infrastructure. This information does not automate a human's analysis, but instead provides a customized approach to analyzing textual data. In turn, the log analysis can be used to automate a network, provide a closed-loop system on assurance, and/or augment network operations and engineering.

Specifically, according to one or more embodiments of the disclosure as described in detail below, an apparatus obtains unstructured text generated by a device regarding operation of the device. The apparatus identifies the unstructured text as associated with a particular command or process that generated the unstructured text. The apparatus classifies a portion of the unstructured text as anomalous by inputting the portion of the unstructured text to a machine learning-based model trained to predict text generated by the particular command or process. The apparatus provides provide the unstructured text for display that includes an indication that the portion of the unstructured text is anomalous.

Illustratively, the techniques described herein may be performed by hardware, software, and/or firmware, such as in accordance with the text analysis process 248, which may include computer executable instructions executed by the processor 220 (or independent processor of interfaces 210) to perform functions relating to the techniques described herein.

Figure 3:
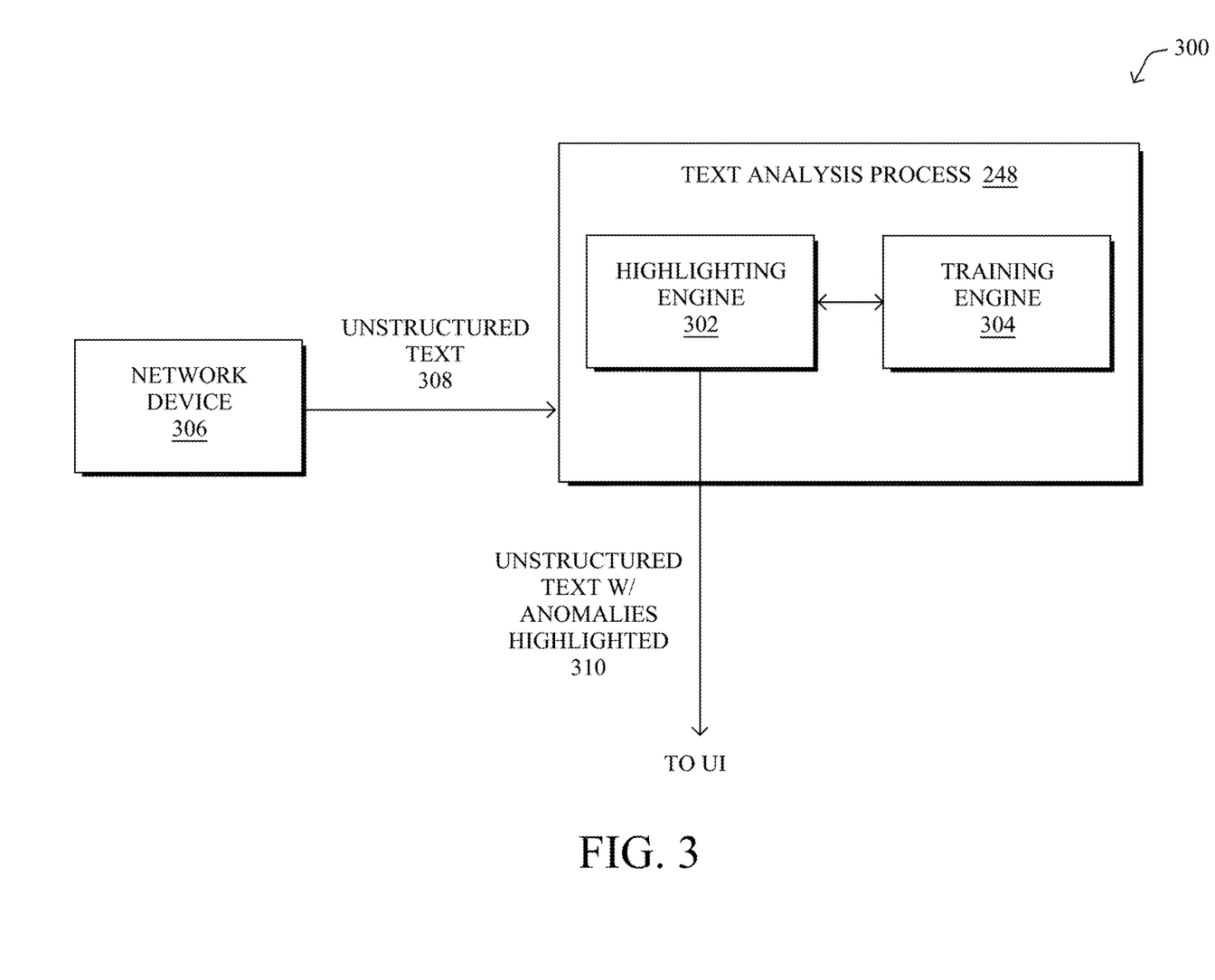
FIG. 3 illustrates an example architecture for identifying anomalous portions of unstructured text.

Operationally, FIG. 3 illustrates an example architecture 300 for identifying anomalous portions of unstructured text, according to various embodiments. At the core of architecture 300 is text analysis process 248 which may comprise any or all of the following components: a highlighting engine 302 and a training engine 304. The functionalities of highlighting engine 302 and training engine 304 may also be combined, omitted, or implemented as part of other processes, as desired. In addition, while highlighting engine 302 and training engine 304 are shown in a centralized manner, they may be executed in a distributed manner, in further embodiments.

During execution, text analysis process 248 may analyze "machine text" generated by any number of devices in a computer network. In general, machine text has three main properties:
1. It is typically made for consumption by humans (e.g., is intended to be read by a user).
2. There is some degree of regularity in its structure, even if the structure is latent.
3. Underlying the text is an intent or purpose (e.g., a process that produced the text). This observation allows text to be grouped that was produced by the same underlying process. For example, all syslog text can be grouped with other syslog text, text that is outputted from a 'show interface' command can be grouped with other 'show interface' text output, etc.

Examples of machine text may include, but are not limited to, any or all of the following:
Log files generated by applications (syslog)
CLI outputs (e.g., 'show interface,' etc.)
Text elements of the interface (e.g., the text interface of a Linux installation, etc.)

For example, as shown, text analysis process 248 may obtain unstructured text 308 from a networking device 306, such as a network router or network switch. Unstructured text 308 may comprise CLI output text, log file text, or the like. Networking device 306 may provide unstructured text 308 to text analysis process 248 either directly or indirectly (e.g., via any number of networking and/or storage devices). In addition, networking device 306 may provide unstructured text 308 to text analysis process 248 on a push or pull basis, as desired.

In various embodiments, highlighting engine may comprise any number of machine learning-based models trained by training engine 304 to predict portions of unstructured text 308. More specifically, training engine 304 may train a model making it read many examples of machine text of the same intent. By doing so, the model learns the latent structure of the text. In turn, highlighting engine 302 may use the model to identify anomalies/deviations from the expected text in unstructured text 308. If highlighting engine 302 identifies such an anomaly, it may include an indication of the anomalous text with unstructured text 308 for presentation by a user interface (UI), such as a display. For example, highlighting engine 302 may identify at least a portion of unstructured text 308 as anomalous and, in turn, provide the unstructured text with the anomalies highlighted 310 to the user interface.

Figure 4A:
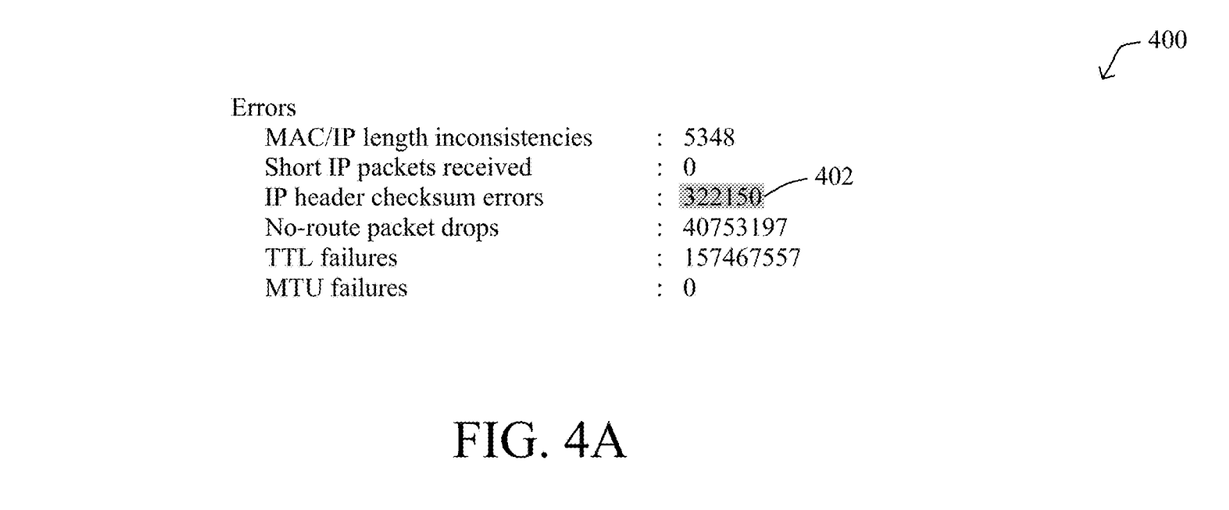
FIGS. 4A-4D illustrate examples of highlighting added to unstructured text for display.
Figure 4B:
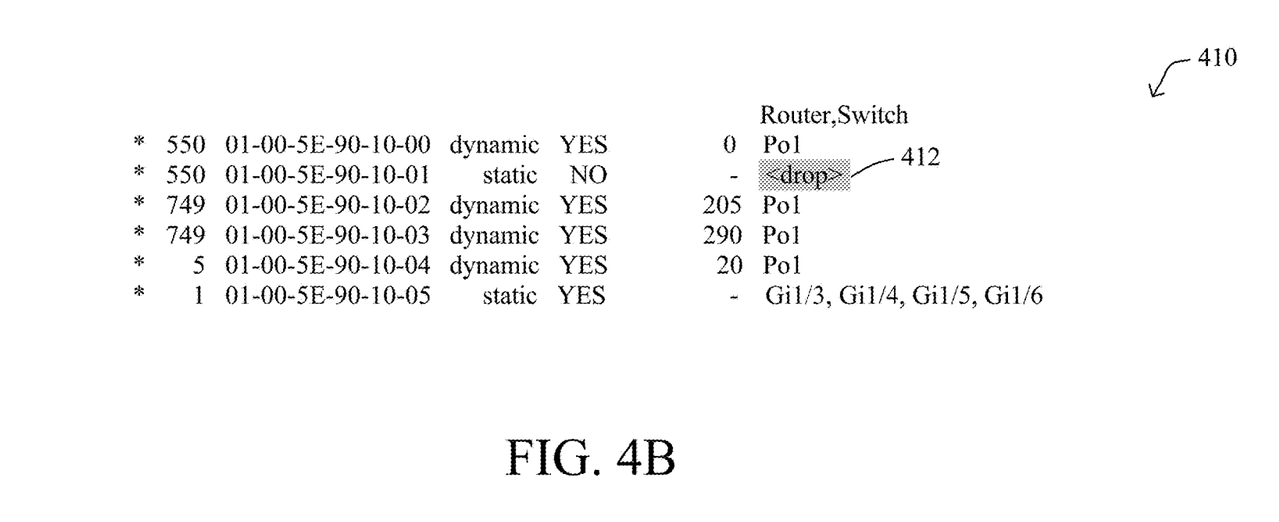
Figure 4C:
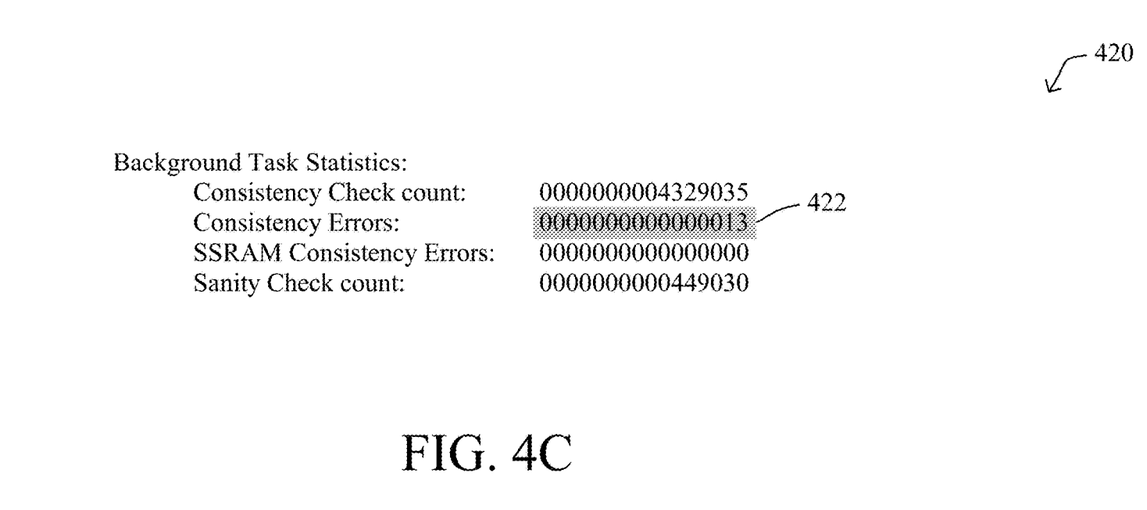
Figure 4D:
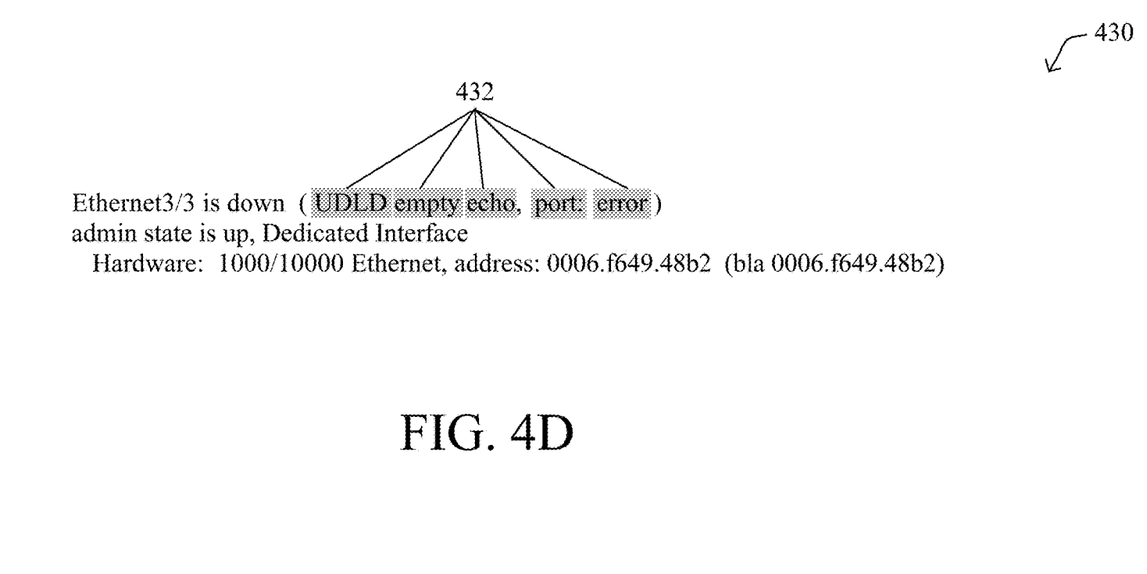

FIGS. 4A-4D illustrate examples of highlighting added to unstructured text for display, according to various embodiments. More specifically, FIGS. 4A-4D illustrate sections 400, 410, 420, and 430 of the text generated by a network router in response to a CLI command of 'show ip arp statistics interface-all vrf', respectively. To demonstrate the efficacy of the techniques herein, a machine learning-based model was trained using a training dataset of 1,000 examples of the CLI output for this command, allowing the model to learn the normal behavior of this text output. FIG. 4A illustrates the 'Errors' section 400 of the CLI command output with portion 402 highlighted, indicating that the IP header checksum errors are anomalous. Similarly, FIG. 4B illustrates section 410 of the CLI command output with portion 412 highlighted, indicating that the "<drop>" of the text for the interface is anomalous. FIG. 4C illustrates the 'Background Task Statistics' section 420 of the CLI command output, with portion 422 highlighted, indicating that the number of consistency errors is anomalous. Finally, FIG. 4D illustrates section 430 of the CLI command output, with portion 432 highlighted. In this case, the system may use different indicia, such as colors, to denote how anomalous the text is.

Figure 5A:
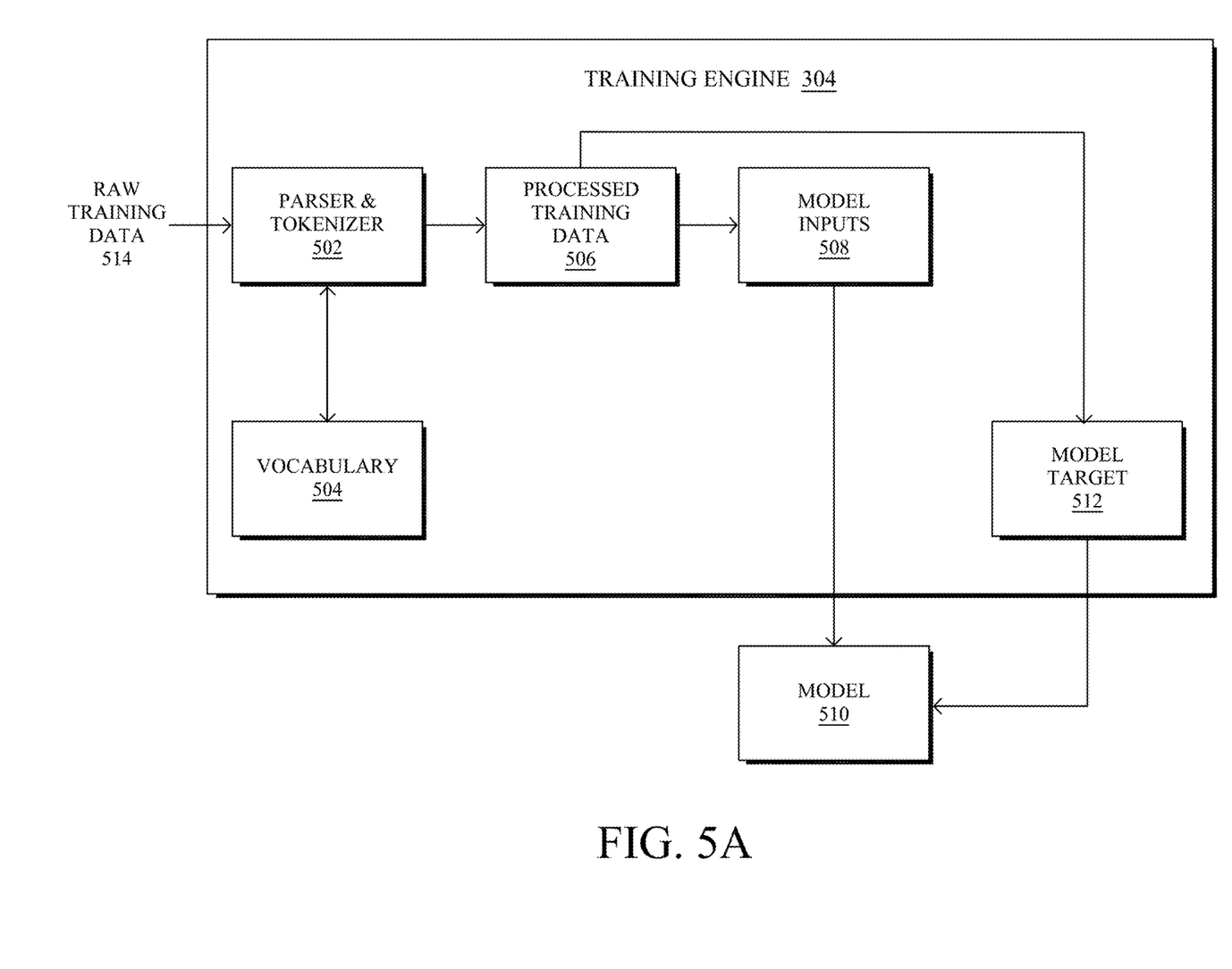
FIGS. 5A-5B illustrate the architecture of FIG. 3 in greater detail.
Figure 5B:
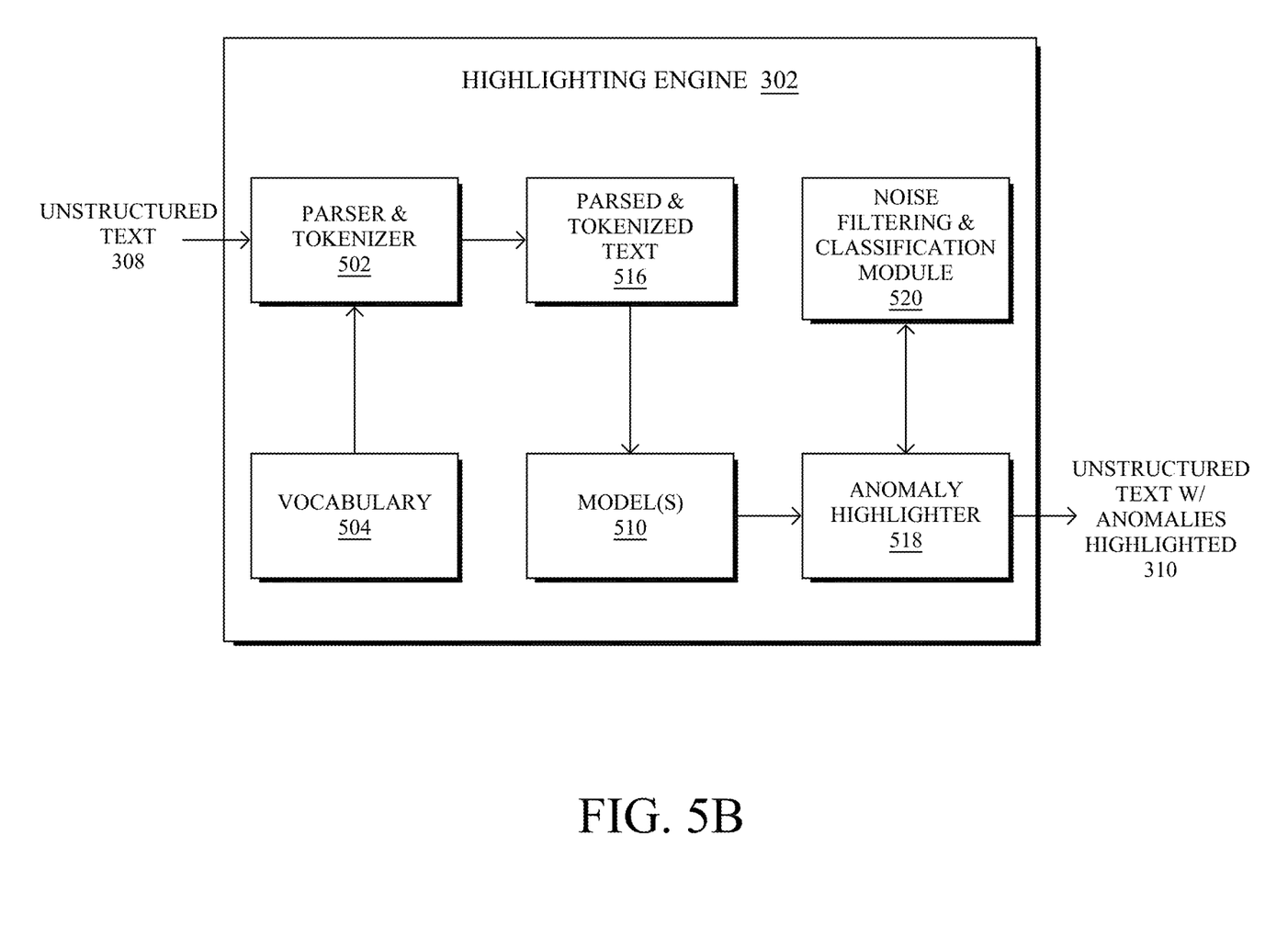

FIGS. 5A-5B illustrate the architecture 300 of FIG. 3 in greater detail, according to various embodiments. More specifically, FIG. 5A illustrates training engine 304 in greater detail and FIG. 5B illustrates highlighting engine 302 in greater detail.

As shown in FIG. 5A, training engine 304 may comprise a number of components/sub-processes configured to train a machine learning-based model 510 to identify anomalies within unstructured text. To do so, training engine 304 may obtain raw training data 514 comprising unstructured text generated by any number of networking devices. In some embodiments, raw training data 514 may be grouped by intent for assessment by training engine 304. For example, training engine 304 may partition raw training data 514 into {instruction; raw text} pairs, where the 'instruction' is typically a CLI command, or other context which identifies the trigger for the output. Notably, to capture the latent structure of the text, training engine 304 may train a model for each intent (e.g., CLI command, monitoring process/ agent, etc.) that generated raw training data 514. For example, raw training data 514 may comprise hundreds, or even thousands, of examples of the output of the 'show ip arp statistics interface-all vrf' CLI command.

To identify the intent of the unstructured text, training engine 304 may include a parser & tokenizer 502 that parses and tokenizes raw training data 514 into processed training data 506, leveraging a vocabulary 504 which comprises defined entities likely to appear within raw training data 514. For example, vocabulary 504 may be of the following form:

TABLE 1

| ID | Word/Entity |
|---|---|
| 1 | Ethernet |
| 2 | up |
| 3 | belongs |
| ... | ... |

By way of example, assume that the unstructured text in raw training data 514 includes the following text:

"Thu March 23 14:03:35 2017
   my address: 10.10.1.29
   my counter: 105"

In such a case, this text can be represented as entities as follows:

"enttimestamp
my address: entipvfouraddr
my counter: #L2"

From this, each word/entity can be assigned an index and stored in vocabulary 504 as follows:

```
{
enttimestamp: 0,
\n: 1,
my: 2,
address: 3,
entipvfouraddr: 4,
counter: 5,
#L2: 6
}
```

In turn, parser & tokenizer 502 can tokenize the unstructured text from raw training data 514 by representing each term/word by the index of its corresponding entity in vocabulary 504, effectively transforming the machine text into a numeric vector in processed training data 506. For example, parser & tokenizer 502 may transform the above example text into the following vector, using vocabulary 504:

[0, 1, 2, 3, 4, 1, 2, 5, 6]

In various embodiments, the defined entities in vocabulary 504 may include any or all of the following: numeric entities, highly variable entities, and/or named entities. In general, numeric entities allow for the tokenization of numbers appearing in the unstructured text, with each token representing a degree of magnitude. In one embodiment, training engine 304 may compute the logarithm of a number, round it, and represent the number as a specific token in vocabulary 504 (e.g., with the format #L<log>). For example, the following numbers can be represented in vocabulary 504 as follows:

105→#L2
14839→#L4
42'→'#L1

Highly variable entities in vocabulary 504 allow parser & tokenizer 502 to encode alphanumeric tokens in the unstructured text to be encoded as spelling features in processed training data 506. Indeed, most alphanumerical words are too random to be put directly into vocabulary 504. To get a more consistent representation, these words may be encoded in vocabulary 504 by extracting, character by character, only some features out of them, such as whether a letter is capitalized, whether a character is a number, etc. For example, the following unstructured text may be converted into variable entities in vocabulary 504 as follows:

10G→00A
channel20→aaaaaaa00

Optionally, vocabulary 504 may also include named entities, which may be entered manually by a domain expert, leading to greater model performance. For example, the following text can be represented using named entities as follows:

10.10.1.29→"entipvfouraddr
Thu March 23 14:03:35 2017→enttimestamp

The techniques herein do not impose any requirement on the structure of the unstructured text, as long as the input adheres to the definition of machine text. That means that any text generated by a networking device can be seen as input. However, one of the challenges of having text as input is the unstructured nature of text. For instance, the variable length of the text can be quite challenging. To address this, the techniques herein use machine learning to predict the text on a word by word basis, allowing the system to operate on text of varying lengths.

In some embodiments, training engine 304 may form model inputs 508 on which model 510 is trained by grouping the vectors processed training data 506 by intent. Each vector element processed training data 506 may be treated as a label, along with its surrounding context, to form model inputs 508 on which model 510 is trained for the corresponding intent. For instance, the word "address" can be coupled with the following context, if the context is assumed to be a window of two words before and words after the target word: [1, 2, 4, 1], which corresponds to the following list of words: ["\n", "my", "entipvfouraddr", "\n"].

In general, training engine 304 uses model inputs 508 to train model 510 to predict a model target 512, which is a portion of the unstructured text for a given intent, such as a word, etc. (e.g., from processed training data 506). Preferably, model 510 may be a deep learning-based neural network, although other forms of machine learning models may be used, in other embodiments. For example, a 4-layer, fully connected, neural network was trained during prototyping and shown to exhibit suitable performance.

In order to predict model target 512, training engine 304 may train model 510 using an iterative training loop using the following:

input: the sequence of processed words constituting the context of the target word. Prototyping of the techniques herein show that a window of 20 words surrounding the target gives already very good results. However, other size windows can also be used, as desired.

output: the vocabulary specific to the machine text, with a score assigned to each word. The score can be interpreted as the probability of predicting the word in place of the target word.

By way of example, assume that the tokenized text in processed training data 506 is of the form:

[1 4 2 10 40 21 3 8 40 183 73 40 42 59 5 94]

To predict the 'word' 3 with a context size of six, the following vector can be populated in model inputs 508: [10 40 21 3 40 183], with the following as model target 512: [3]. In other words, to predict the word that appears in vocabulary 504 with index '3', a grouping of six words/indices can be input to model 510, including words/indices that appear before and/or after the target word.

Similarly, using the same tokenized input text above, assume that model 510 is to be trained to predict the word '8' with a context size of six. In such a case, model target 512 may be [8] and model inputs 508 may be [40 21 3 40 183 73]. By repeating this process many times over, model 510 will learn the expected portion of text at any given point in the unstructured text for the intent, allowing model 510 to predict the portion of text, based on the other surrounding it.

The learning of model 510 may also be made in an unsupervised way. As the (target, context) pairs coming from the training examples are fed to model 510, it will start to learn the inner structure of the machine text and become able to predict a target given its context. This simple framework allows for the production of intent-specific models en masse.

Referring now to FIG. 5B, highlighting engine 302 is shown in greater detail, according to various embodiments. At the core of highlighting engine 302 are the machine learning-based model(s) 510 trained by training engine 304, which may be on a per-intent basis, in some embodiments. During execution, highlighting engine 302 may use the trained model(s) 510 identify anomalous portions in unstructured text 308 and include indicia of the anomalous portion(s), such as highlighting, hover-over effects, different text fonts, or the like, for display.

Once model(s) 510 have learned the intrinsic structure of a type of machine text, they can be applied by highlighting engine 302 to unseen text data having the same intent. The system again works, word by word, trying to predict each word given their context. Such predictions may be accompanied by a score that represents the probability of the predicted word/portion of text appearing in the unstructured text, given the context words.

In general, highlighting engine 302 may operate in a similar manner as that of training engine 304. Notably, highlighting engine 302 may include parser & tokenizer 502 and vocabulary 504, allowing highlighting engine 302 to transform the unstructured text 308 input to highlighting engine 302 into parsed & tokenized text 516, as detailed above. In various embodiments, parser and tokenizer 502 may register these transformations into a stack, to make them reversible.

Highlighting engine 302 may use the vectorized text in parsed & tokenized text 516 as input to the model 510 associated with the intent of that text. In turn, model 510 may predict the words/portions of unstructured text 308. This means that, for each word in the text, model 510 knows the most likely words that are to be seen. For each predicted word/portion of text, model 510 may also assign a class to the prediction, such as 'normal,' 'noisy deviation,' 'deviation,' 'critical deviation,' etc. This may be done, for example, based on analysis of the distribution of predicted label weights (logits).

In various embodiments, highlighting engine 302 may include an anomaly highlighter 518 configured to relate the predicted words/portions from model 510 to the input unstructured text 308. If the prediction from model 510 deviates from the actual portion of unstructured text 308 by a predefined threshold, anomaly highlighter 518 may include an indication of the anomaly with that portion of text, such as by applying highlighting to the portion of text. In some embodiments, the anomaly threshold used by anomaly highlighter 518 may be user configurable, allowing the user to control the sensitivity of highlighting engine 302. In particular, a higher sensitivity (e.g., a lower anomaly threshold) will highlight more text as it is more easily considered deviant. In further embodiments, anomaly highlighter 518 may use multiple thresholds, allowing anomaly highlighter 518 to apply different indicia to the portion of text, based on how much of a deviation exists between the actual text and the portion of text predicted by model 510 (e.g., red highlighting for the most deviant, yellow highlighting for intermediate anomalies, etc.). Of course, anomaly highlighter 518 may apply other forms of indicia to indicate the detected anomalies, such as hover-over text, different font colors, or the like, in further embodiments.

As would be appreciated, the data arriving at anomaly highlighter 518 is still in its transformed state. In such cases, anomaly highlighter 518 may reverse the tracked list of transformation previously applied by parser & tokenizer 502. The key here is the ability of anomaly highlighter 518 to keep track of the positions of deviations while reversing the transformations of the data. When this is done, the end result is the initial machine text (i.e., unstructured text 308), augmented with the classified deviation. These deviations can then be presented in conjunction with the text using various indicia, such as different colors of highlighting with respect to the classes (e.g., normal deviation or potentially critical deviations, etc.).

In some embodiments, highlighting engine 302 may also include a noise filtering and classification module 520 configured to suppress highlighting or other indicia by anomaly highlighter 518 that is considered 'noise.' Of course, not everything is predictable in unstructured text, even when generated by a device. Some fields, such as serial numbers and device descriptions, are simply too variable and, therefore, may be flagged by model 510 as anomalous, even though they are of little value to the user. Accordingly, in some embodiments, noise filtering and classification module 520 may operate in conjunction with anomaly highlighter 518 to reduce this kind of noise by looking again at the model output from model 510 and identifying the places where words are very unpredictable, based on their score distribution.

For example, a flat distribution from model 510 indicates model uncertainty and these predictions may be attributed to noise by noise filtering and classification module 520. Conversely, a real deviation will be seen as a wrong prediction in a very certain context, such as a very small subset of labels with high weights. If the score distribution is too flat, this means that a lot of different things are usually seen in that place in the text. These deviations can then be classified by noise filtering and classification module 520 as "variable fields," and may be suppressed from presentation to the user, as they are considered to be noise. In other words, even if a particular portion of unstructured text 308 is considered anomalous, highlighting engine 302 may suppress highlighting of that portion of text, if the portion is simply too variable to predict. Overall, the goal of noise filtering and classification module 520 is to focus the attention of the reader on the most critical deviations and may also consider the context of the deviations, in an attempt to identify words in the lexical field of "error" and "issues."

Once highlighting engine 302 has completed its analysis of unstructured text 308, it may then provide the unstructured text 310 with indicia generated by anomaly highlighter 518 for display to the user. By highlighting the anomalous portions of the unstructured text, or including other anomaly indicia, this allows the reader to quickly focus in on the portions of the unstructured text that may signify errors or other problems with the networking device.

As would be appreciated, the components of training engine 304 highlighting engine 302 and in FIGS. 5A-5B may be combined or omitted, as desired. In addition, some embodiments provide for training engine 304 to be executed on a different device than that of highlighting engine 302, such as by pushing highlighting engine 302, or simply model(s) 510, to another device for execution.

Figure 6:
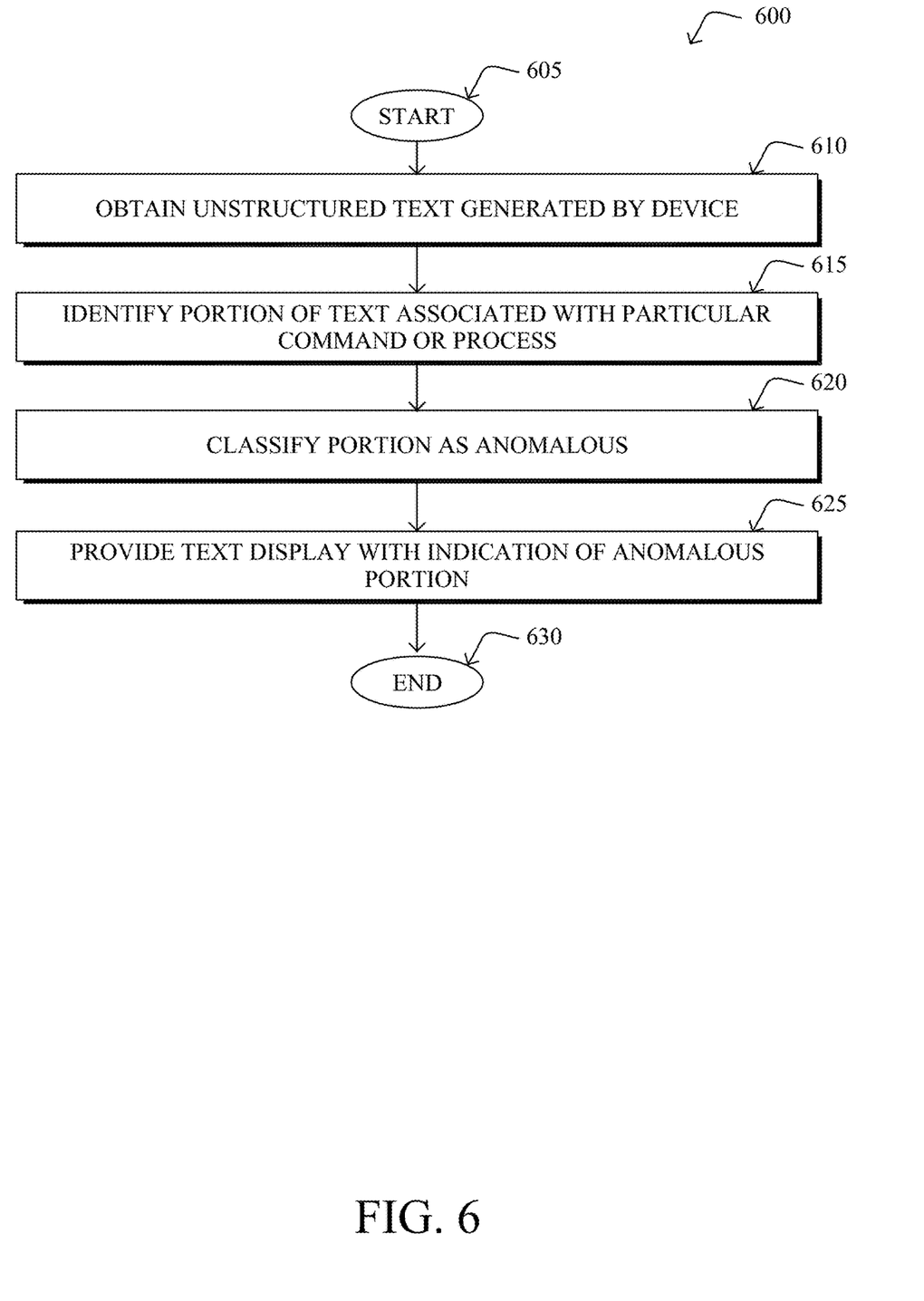
FIG. 6 illustrates an example simplified procedure for identifying anomalies in unstructured text.

FIG. 6 illustrates an example simplified procedure 600 for identifying anomalies in unstructured text for pairing the Wi-Fi of a trailer to a tractor unit, according to various embodiments. For example, a non-generic, specifically configured device/apparatus (e.g., device/apparatus 200), may perform procedure 600 by executing stored instructions (e.g., process 248). The procedure 600 may start at step 605, and continues to step 610, where, as described in greater detail above, the apparatus may obtain unstructured text from a device regarding operation of the device. For example, the device may be a networking device, such as a network router, network switch, or the like, and the unstructured text may be generated by a CLI command, log data generated by a specific agent or process of the device, etc.

At step 615, as detailed above, the apparatus may identify the unstructured text as associated with a particular command or process that generated the unstructured text. In other words, the apparatus may assess the unstructured text, to determine the specific intent associated with the text. For example, the apparatus may determine that the unstructured text was generated by the 'show ip arp statistics interface-all vrf' CLI command.

At step 620, the apparatus may classify a portion of the unstructured text as anomalous by inputting the unstructured text to a machine learning-based model trained to predict text generated by the particular command or process, as described in greater detail above. For example, the model may be a neural network-based model that has been trained to predict words or other portions of text for the intent associated with the unstructured text obtained in step 610. If the prediction deviates from the actual portion of text by a threshold amount, the apparatus may deem the portion of text as anomalous. Depending on the score distribution, the apparatus may also deem a portion of the unstructured text as variable text, even though it is anomalous from a machine learning perspective, and treat this portion as noise (e.g., by suppressing highlighting or other indicia for that portion).

At step 625, as detailed above, the apparatus may provide the unstructured text for display that includes an indication that the portion of the unstructured text is anomalous. For example, the indication may comprise a highlighting or other visual effect for the portion of text identified as anomalous. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a machine learning-based method for automatically annotating an unknown or arbitrary text generated by a device. Doing so aids the reader of the unstructured text by indicating the portions of the text that may be relevant from a diagnostics standpoint.

While there have been shown and described illustrative embodiments that provide for accelerated diagnostics on unstructured data, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while the techniques herein are described primarily with respect to unstructured text generated by networking devices, the techniques can be applied to any form of unstructured machine text, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    obtaining unstructured text generated by a device regarding operation of the device;
    identifying the unstructured text as associated with a particular command or process that generated the unstructured text;
    classifying a portion of the unstructured text as anomalous by inputting the unstructured text to a machine learning-based model trained to predict text that is generated by the particular command or process and expected to appear in the unstructured text, wherein the portion of the unstructured text is classified as anomalous when it deviates from the text that is predicted by the machine learning-based model; and
    providing the unstructured text for display that includes an indication that the portion of the unstructured text is anomalous.

2. The method as in claim 1, wherein the indication comprises highlighting of the portion of the unstructured text.

3. The method as in claim 1, wherein the machine learning-based model comprises a neural network.

4. The method as in claim 1, further comprising:
    tokenizing one or more numbers in the portion of the unstructured text to represent a magnitude, prior to input to the machine learning-based model.

5. The method as in claim 1, wherein the unstructured text comprises log data or command line interface (CLI) text generated by the device.

6. The method as in claim 1, further comprising:
    classifying a second portion of the unstructured text as anomalous; and
    identifying the second portion of the unstructured text as a variable field based on a score distribution calculated by the machine learning-based model.

7. The method as in claim 1, further comprising:
    training the machine learning-based model to predict text generated by the particular command or process using a training dataset comprising text generated by the particular command or process.

8. The method as in claim 1, wherein the device comprises a network router or network switch.

9. The method as in claim 1, further comprising:
    tokenizing one or more characters of the portion of the unstructured text, prior to input to the machine learning-based model, based on whether the one or more characters are capitalized.

10. An apparatus, comprising:
one or more network interfaces to communicate with a network;
a processor coupled to the network interfaces and configured to execute one or more processes; and
a memory configured to store a process executable by the processor, the process when executed configured to:
  obtain unstructured text generated by a device regarding operation of the device;
  identify the unstructured text as associated with a particular command or process that generated the unstructured text;
  classify a portion of the unstructured text as anomalous by inputting the portion of the unstructured text to a machine learning-based model trained to predict text that is generated by the particular command or process and expected to appear in the unstructured text, wherein the portion of the unstructured text is classified as anomalous when it deviates from the text that is predicted by the machine learning-based model; and
  provide the unstructured text for display that includes an indication that the portion of the unstructured text is anomalous.

11. The apparatus as in claim 10, wherein the indication comprises highlighting of the portion of the unstructured text.

12. The apparatus as in claim 10, wherein the machine learning-based model comprises a neural network.

13. The apparatus as in claim 10, wherein the process when executed is further configured to:
  tokenize one or more numbers in the portion of the unstructured text to represent a magnitude, prior to input to the machine learning-based model.

14. The apparatus as in claim 10, wherein the unstructured text comprises log data or command line interface (CLI) text generated by the device.

15. The apparatus as in claim 10, wherein the process when executed is further configured to:
  classify a second portion of the unstructured text as anomalous; and
  identify the second portion of the unstructured text as a variable field based on a score distribution calculated by the machine learning-based model.

16. The apparatus as in claim 10, wherein the process when executed is further configured to:
  train the machine learning-based model to predict text generated by the particular command or process using a training dataset comprising text generated by the particular command or process.

17. The apparatus as in claim 10, wherein the device comprises a network router or network switch.

18. The apparatus as in claim 10, wherein the process when executed is further configured to:
  tokenize one or more characters of the portion of the unstructured text, prior to input to the machine learning-based model, based on whether the one or more characters are capitalized.

19. A tangible, non-transitory, computer-readable medium storing program instructions that cause an apparatus in a network to execute a process comprising:
  obtaining unstructured text generated by a device regarding operation of the device;
  identifying the unstructured text as associated with a particular command or process that generated the unstructured text;
  classifying a portion of the unstructured text as anomalous by inputting the portion of the unstructured text to a machine learning-based model trained to predict text that is generated by the particular command or process and expected to appear in the unstructured text, wherein the portion of the unstructured text is classified as anomalous when it deviates from the text that is predicted by the machine learning-based model; and
  providing the unstructured text for display that includes an indication that the portion of the unstructured text is anomalous.

20. The computer-readable medium as in claim 19, wherein the indication comprises highlighting of the portion of the unstructured text.

* * * * *

UNITED STATES PATENT AND TRADEMARK OFFICE
CERTIFICATE OF CORRECTION

PATENT NO. : 11,537,877 B2
APPLICATION NO. : 16/374911
DATED : December 27, 2022
INVENTOR(S) : Dmitry Goloubew It is certified that error appears in the above-identified patent and that said Letters Patent is hereby corrected as shown below:

In the Specification

Column 2, Line 26, please amend as shown:
nodes typically communicate over the network by Signed and Sealed this
Twenty-eighth Day of March, 2023

Katherine Kelly Vidal
*Director of the United States Patent and Trademark Office*